United States Patent Office 3,093,606
Patented June 11, 1963

3,093,606
EXTENDER COMPOSITIONS AND SYNTHETIC RESIN GLUE SOLUTIONS CONTAINING THE SAME
Joseph W. Ayers, Easton, Pa., assignor to Agrashell, Inc., Los Angeles, Calif., a corporation of Delaware
No Drawing. Filed June 30, 1960, Ser. No. 39,815
15 Claims. (Cl. 260—17.2)

This invention relates to extender compositions and synthetic resin glue solutions containing the same, designed specifically for use by the plywood production industry. It may be considered to include also processes of producing superior glue solutions having properties leading to plywood and other laminated products of consistently high quality bond.

As set forth in my copending applications Serial No. 425,051 now U.S. Patent 3,017,303 and Serial No. 643,501, filed March 4, 1957, and now abandoned, having been replaced by application Serial No. 39,812, filed June 30, 1960, I have heretofore discovered that extender compositions composed of vegetable shell flour containing an addition of a minor amount of a finely divided, extracted lignin, either in unoxidized form or in oxidized form, can improve the properties of phenolic resin and other glue solutions when added thereto, by increasing the viscosity of the solution and decreasing the penetration of the glue into soft or porous surfaces of core woods. The addition of the extracted lignin in oxidized form produces exceptionally high grade plywood of the most varied construction (as to both thickness and number of veneers), even when the core wood is of low grade or rough stock. The compositions and solutions of the present invention may contain basically these same ingredients.

An immediate object of the present invention is to provide extender compositions and adhesive solutions containing the same which constitute improvements over said prior compositions and solutions particularly as to more effective and uniform application of the glue solution from the rapidly rotating rolls of the glue spreading machines used in plywood manufacture.

The overall object of the invention is to provide novel adhesive solutions containing new extender compositions, possessing to a unique degree all of the desirable properties for producing plywood of consistently high quality both as to strength and water-resistance, from all grades of wood including soft wood and non-uniform or rough cores, which properties include high glue viscosity and viscosity stability, uniform transfer and spreading from the applicator rolls, stability of film during assembly and lack of excessive penetration into wood pores.

Broadly considered, the extender compositions of the invention are basically composed of a vegetable shell flour extender, a minor amount of an extracted lignin preferably at least in part in oxidized form and a lignocellulosic hydrolysis-degradation product or residue of a vegetable material of highly extractable pentosan content, such as a residue obtained from oat hulls.

The vegetable shell flour used is exemplified by nut shells, as those of English and black walnuts and pecans, fruit pit shells, as those of apricots and peaches.

The extracted lignin component hereinbefore mentioned is exemplified by the so-called "alkali lignin" produced as a by-product from wood pulping processes employing alkali, the most common procedure being known as the kraft process. Extracted lignins produced by biological and selective solvent action, as well as those prepared by chemical action can be employed, and in common the lignin products are free or substantially free of combined cellulosic constituents, wood sugars and other products of the wood or other ligno-cellulosic materials from which the lignin is obtained, and such extracted lignins are all soluble in alkali, apparently producing sodium lignate.

The lignin components of the oxidized lignins of applicant's compositions are both acid-insoluble and water-insoluble and are referred to as being "extracted," for they are products which have been separated from the wood or other lignocellulose material. Sulfonic acid derivatives, or lignin sulfonates, such as are obtained in the sulfite process of paper production being acid- and water-soluble are not included within the scope of said term. Only through the use of lignin in extracted form can the quality and the performance of the adhesive compositions of the invention be attained and maintained. To produce commercially acceptable results, experience has shown that it is essential that not only must the lignocellulose extender be of known constitution and uniform character, but also the oxidized lignin component must be of a definite and known quality.

Suitable extracted lignins are described in the booklet entitled "Indulin" issued by the West Virginia Pulp and Paper Co., Charleston, West Virginia (1951). Other suitable lignin products contemplated are disclosed in the booklet entitled "Commercial Lignins" by Robert S. Aries and Arthur Pollak issued by the Northeastern Wood Utilization Council, New Haven, Connecticut (1949).

The oxidized lignin preferably used in the practice of the invention may be obtained by oxidation in neutral solution, in alkaline solution or, under certain circumstances, in an acid solution, but it can also be accomplished electrolytically or by enzymatic action. Practically considered, the oxidation is accomplished under aqueous alkaline conditions simply by introducing oxygen into the aqueous alkaline suspension of the extracted lignin.

The oxidized extracted lignins are those extracted lignins hereinbefore described which have been oxidized to a point where they impart an increased viscosity of practical effect to aqueous glue solutions in which they are incorporated. The oxidation effected imparts stability to glue solutions to which the oxidized lignin has been added, by preventing loss of glue at the glue lines due to excessive penetration into the pores of the surfaces of the plies during curing. This retention of viscosity during heating to the setting temperature and the prevention of excessive flow into the pores constitutes the primary advantage of the presence of the extracted lignin in the oxidized condition. Oxidation to an extent providing any appreciable degree of viscosity increase in the aqueous suspension improves the retention at the glue line.

As is indicated in the hereinbefore mentioned Indulin booklet (page 18), the oxidation may be effected satisfactorily by introducing oxygen into an alkaline solution in water or other solvent until about 1 to 7 mols of oxygen per mol of lignin (M.W. 840) has taken up. The alkalinity may be imparted by the addition of any alkali, suitably sodium hydroxide, in a quantity of from 1–16 mols per mol of extracted lignin. As is also pointed out in said booklet, the rate and extent of oxygen absorption is increased with increasing alkali content. If the oxidation is continued too long, the gel is advanced in structure too far, and drying and further processing becomes very difficult or practically impossible. Thus it is the practical problem of handling which limits the permissible amount of oxidation. In all instances, the oxidation is terminated, of course, before any drastic breakdown of the lignin molecules occurs and destroys their viscosity-imparting qualities.

An oxidized lignin found particularly effective was produced by concentrating a spent black cooking liquor obtained from a kraft paper process to provide a liquid containing 18 to 20% solids. Cooled carbon dioxide gas was then bubbled through the concentrated solution while said solution was being continuously circulated, to precipitate the lignin. Upon completion of the precipitation, the carbonated liquor was heated at a temperature close to boiling to bring about coagulation of the lignin. After being cooled, the coagulated liquor was separated by filtration and the lignin was purified by washing.

The washed cake was then repulped in water and sufficient sodium hydroxide was added to adjust the pH of the suspension to an approximate value of 9. Thereupon air was blown into the solution during vigorous agitation until oxidation had occurred, this result being determined by the viscosity increase of the suspension. After oxidation, the suspension was concentrated, filtered and dried, this latter result preferably being obtained by spray drying. The final product thus obtained can be described as a technically pure, oxidized, extracted alkali lignin.

The completion of the oxidation step in the above-described process was determined by a standardized test involving adding 60 grams of the oxidized product and 300 grams of distilled water to a 600 cc. beaker. The mixture in the beaker was then stirred for three minutes with an electric stirrer. Next a sodium hydroxide solution made up of 50 grams water and 2 grams of solid sodium hydroxide was added. The resulting mixture was then electrically stirred for a period of five minutes. Thereupon, the mass was adjusted to a temperature of 77° F. and allowed to stand at this temperature for fifteen minutes. At the end of this period, the viscosity was measured with a Brookfield viscosimeter equipped with a No. 4 spindle, at 6 r.p.m. The reading was 90,000 centipoises.

Using this test for the determination and control of the oxidation, oxidized extracted lignins operable for the purposes of the present invention have revealed viscosities as low as 5000 centipoises and viscosities much higher than the 90,000 centipoises reading.

In addition to the above defined oxidized, extracted alkali lignin, the invention contemplates the use of oxidized, extracted alkali lignins containing some thiolignin due to the presence of SH groups introduced into the lignin molecules by the action of sodium sulfide during cooking processes used in preparing paper by the sulfide process.

No invention is claimed as to the degradation products, per se, for examples of such materials and their preparation are completely described in the literature, e.g. in the Ash et al. Patent No. 2,727,869. In this patent, the degradation products are disclosed as being solid, furfural by-product residues of the extraction of pentosans, by acid hydrolysis, from pentosan-containing materials, such as oat hulls and corn cobs, from plants of the family Graminales.

Only a small amount of the degradation product is required to influence favorably both the properties of the glue solutions in which it is used and the quality of the plywood bonded with the glue solution. In the extender composition, the degradation product may amount to only 5%, but it may constitute as much as 40% in some formulations. The extracted lignin whether in its oxidized form or not, may amount to from 5 to 50%, and preferably from 15–20% of the total weight of the three-component extender compositions.

The three components to be combined to form the extender composition may be blended merely by mixing the same in finely divided form in a standard ribbon type blender until a homogeneous product is obtained.

The extender compositions hereinbefore described can be employed very advantageously with plywood glue solutions of conventional types which are generally aqueous alkaline emulsions of artificial resins. Under some conditions, the amount of alkali already in the glue solution is sufficient, but ordinarily the addition of caustic alkali or sodium carbonate in amounts somewhat in excess of that which reacts with the extender components improves the bonding quality of the glue solution. Although 5% of either or both of said alkali materials (calculated in relation to the amount of extender composition present) may be sufficient in some glue solutions, the amount may be increased to 15 to 20% or more, as to each of said alkaline materials.

Plywood fabricators obtaining the extender compositions hereinbefore described can produce the adhesive solutions of the invention by gradually adding such compositions to the water to be used for dilution of the resin to which has already been added the sodium hydroxide or other caustic alkali ordinarily employed, and the mixture is agitated until uniform fluidity is obtained, 20 to 30 minutes usually being sufficient. When sodium carbonate is to be employed, it is preferably introduced immediately after the extender composition has been added. The application of heat is not ordinarily required. Upon completion of the mixing operation the resin glue solution is added and the mass is again agitated for a few minutes or until a homogeneous mass is obtained.

The resin glue solutions in which the extender compositions are particularly effective may be described as aqueous colloidal solutions of thermosetting aldehydic resin glues. Such solutions are produced and sold by several companies (usually in solutions of 40–50 resin solids content) and their production constitutes no part of the present invention. The resins used include condensation products of phenolic compounds such as phenol, cresol, and resorcinol, or amino-compounds such as urea and melamine with an aldehyde, such as formaldehyde and acetaldehyde.

In the glue solutions produced in accordance with the present invention, conventional ratios of resin to extender composition to water can be employed. When conventional phenolic resin glue aqueous emulsions (about 40–50% solids) are employed the weight ratio of resin to extender to water is, suitably, 5/1/1.75. The ratio of extender and water in the compositions can be greatly increased to provide solutions having ratios of as high as 5/4/7, and such glue solutions are economically acceptable for the production of plywood of one type or another, but all of high grade.

In accordance with a modification of the invention, the extender compositions and adhesive solutions contain in addition to the oxidized lignin, also some plain or unoxidized extracted lignin, all or part of which may be in the form of sodium lignate, as Indulin C. The unoxidized extracted lignin will ordinarily replace part of the oxidized extracted lignin in the compositions herein defined. The amount of the oxidized lignin which can be replaced by unoxidized lignin depends upon a number of factors including the grade or porosity of the wood and viscosity requirements of the glue solution. Displacement in greatest amounts is possible when plywood products of thin construction, as 3/16 inch, are being produced. From 5 to 75% of the oxidized lignin may be replaced by the unoxidized lignin (and/or sodium lignate), and when thin plywood is fabricated, the displacement may reach as high as 90%.

In a special embodiment of the invention leading to the production of particularly high grade plywood, a minor or small amount of epoxy resin is incorporated in the compositions hereinbefore defined. The epoxy resin need be present in an amount as little as .4 to 1%, by weight, of the phenolic resin content to impart worthwhile improvement in quality of the bond. Amounts as high as 20% can be used, but such higher amounts are now economically unfeasible. The epoxy resin is preferably introduced by preliminarily coating the shell flour particles with 2 to 7% resin, but such resin may be mixed in solution form. The epoxy resin used can be any of the commercial adhesive products such as may be produced by reacting bis-phenols or other polyhydroxy compounds with either of the usual chlorohydrins, epichlorohydrin or dichlorohydrin, specific examples of the same being disclosed in the hereinbefore mentioned copending application Serial No. 643,501. Other epoxy resins utilizable are disclosed in the book entitled "Epoxy Resins" by Henry Lee and Kris Neville published by the McGraw-Hill Book Company, Inc., New York, in 1957.

Example 1

Sixty-four parts of English walnut shell flour, 13 parts of finely divided oxidized lignin produced from alkali lignin derived in a kraft paper process, and 23 parts of a commercial acid-hydrolyzed, degradation product of oat hulls, sold under the name Furafil (after drying to 10–12% moisture and grinding to −200 mesh), are mixed in a ribbon blender until a homogenous product is obtained.

Example 2

The procedure of Example 1 is repeated with different proportions using 60 parts walnut shell flour, 16 parts oxidized lignin and 24 parts of the degradation product.

Example 3

For producing a glue solution, 115 parts of the extender composition of Example 2 are continuously added to a mixing tank into which has already been put 200 parts of water and 30 parts of an aqueous sodium hydroxide solution of 50% concentration, the mass being continuously agitated. Next 15 parts of sodium carbonate are added and the mixing continued for about 20 minutes. Thereupon, 500 parts of a phenolformaldehyde glue solution in conventional aqueous emulsion form (40–42% resin solids) are added to the mixer and agitation is continued for about five minutes. The finished glue solution is then ready for pumping to the well of the glue spreading machine for application to plywood veneers.

During the agitation of the mass, both the oxidized lignin and the degradation product dissolve in being transformed, at least in part, to alkaline derivatives, and as a result a high viscosity alkaline glue solution is ultimately obtained having a novel combination of valuable properties hereinbefore described.

Example 4

In any of the foregoing examples the walnut shell flour of unaltered constitution is replaced with a walnut shell flour the particles of which have been coated with an epoxy resin of commerce (Epon) in a quantity of 5%. The glue solution containing this resin coated extender produces plywood having unusually good glue bonding properties under the very adverse conditions encountered in certain localities where plywood is produced.

Example 5

In the procedures of Example 1, the oxidized lignin content is reduced to 10 parts, and 5 parts of unoxidized lignin or sodium lignate is added.

The components of the extender compositions and the glue solutions herein referred to, other than the degradation product component are described in more detail along with additional examples, procedures and advantages in the hereinbefore mentioned prior applications.

The glue solutions of the present invention have several outstanding advantages:

They have an exceptionally high viscosity, leading to more exact and uniform quantities of glue spread in the film applied to the core wood and to greater resistance to the centrifugal force of the rapidly revolving spreader rolls of the glue applying machine, which force has a tendency to throw glue solution off the rolls. After the glue solution has flowed over the wood surfaces in an even spread, it (1) ceases to flow and assumes a limpid gel structure, thixotropic in character, and thus (2) does not penetrate too deeply into the wood even though the wood may be quite porous in character, (3) does not lose too much water by evaporation and (4) retains its binding qualities over a substantial period, providing long assembly time life.

This application is a continuation-in-part of my copending application Serial No. 643,538 filed March 4, 1957, and now abandoned.

It should be understood that the invention is not limited to the exact compounds, proportions, procedures and conditions herein described but that it extends to all equivalents which will occur to those skilled in the art upon consideration of the scope of the claims appended hereto.

I claim:

1. A composition of matter for adding to and improving the viscosity, wood penetration, bonding and other properties of plywood adhesive and other laminating adhesive solutions which comprises, a homogeneous mixture of a vegetable shell flour extender and minor amounts in finely-divided form of extracted lignin at least 10% of which is oxidized lignin containing about 1 to 7 mols of oxygen per mol of lignin, and of a lignocellulosic furfural by-product residue remaining after the extraction of pentosans by acid hydrolysis from pentosan-containing material from plants of the family Graminales 2. A composition of matter for adding to and improving the viscosity, wood penetration, bonding and other properties of plywood adhesive and other laminating adhesive solutions which comprises, a homogeneous mixture of a vegetable shell flour extender and minor amounts in finely-divided form of extracted lignin at least 10% of which isoxidized lignin containing about 1 to 7 mols of oxygen per mol of lignin, and of a lignocellulosic furfural by-product residue remaining after the extraction of pentosans by acid hydrolysis from seed hulls.

3. The composition of claim 1 wherein the residue is obtained from oat hulls.

4. The composition of claim 1 wherein the extracted lignin is substantially entirely in its oxidized form containing about 1 to 7 mols of added oxygen per mol of lignin.

5. A composition of matter for adding to and improving the viscosity, wood penetration, bonding and other properties of plywood adhesive and other laminating adhesive solutions which comprises, a homogeneous mixture of a major proportion of a vegetable shell flour extender, 5 to 40% by weight of finely-divided extracted lignin at least 25% of which is oxidized lignin containing about 1 to 7 mols of added oxygen per mol of lignin, and 5 to 40% by weight of a lignocellulosic furfural by-product residue remaining after the extraction of pentosans by acid hydrolysis from pentosan-containing material from plants of the family Graminales.

6. Plywood-, and laminating-adhesive solutions comprising a thermosetting aldehydic resin glue selected from the group consisting of phenolic-aldehyde resins and aminoaldehyde resins in aqueous alkaline colloidal solution, a vegetable shell flour extender and minor amounts of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

7. A plywood adhesive solution comprising a thermosetting aldehydic resin glue selected from the group consisting of phenolic-aldehyde resins and amino-aldehyde resins in aqueous alkaline colloidal solution, containing therein a vegetable shell flour extender and a minor amount of an alkali-dissolved, extracted lignin in oxidized condition and containing about 1 to 7 mols of added oxygen per mol of lignin, said solution having its viscosity increased and its wood penetration properties decreased by the presence of 5—40% of a lignocellulosic furfural by-product residue remaining after the extraction of pentosans by acid hydrolysis from pentosan-containing material from plants of the family Graminales, said percentage being calculated on the weight of the mixture of the extender, the lignin and the residue.

8. Plywood-, and laminating-adhesive solutions comprising a thermosetting aldehydic resin glue selected from the group consisting of phenolic-aldehyde resins and aminoaldehyde resins in aqueous alkaline colloidal solution, a vegetable shell flour extender, free alkali, and minor amounts of extracted lignin at least 10% of which is oxidized lignin containing about 1 to 7 mols of oxygen per mol of lignin, and of a lignocellulosic furfural by-product residue remaining after the extraction of pentosans by acid hydrolysis from pentosan-containing material from plants of the family Graminales.

9. Plywood-, and laminating-adhesive solutions comprising a thermosetting aldehydic resin glue selected from the group consisting of phenolic-aldehyde resins and amino-aldehyde resins in aqueous alkaline colloidal solution, a vegetable shell flour extender, free alkali, and minor amounts of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

10. The composition of claim 2 wherein the vegetable shell flour is coated with from .4 to 20% of an epoxy resin derived by the reaction of a polyhydroxy hydrocarbon with a compound selected from the group consisting of epichlorohydrin and dichlorohydrin, and containing free epoxy groups.

11. The adhesive solution of claim 6 wherein the resin is supplemented by an epoxy resin derived by the reaction of a polyhydroxy hydrocarbon with a compound selected from the group consisting of epichlorohydrin and dichlorohydrin, and containing free epoxy groups, in a quantity of .4 to 20% based on the weight of the vegetable shell flour.

12. A composition of matter for adding to and improving the viscosity, wood penetration, bonding and other properties of plywood adhesive and other laminating adhesive solutions which comprises, a homogeneous mixture of a vegetable shell flour extender and minor amounts in finely divided form of an extracted lignin, of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

13. A composition of matter for adding to and improving the viscosity, wood penetration, bonding and other properties of plywood adhesive and other laminating adhesive solutions which comprises, a homogeneous mixture of a vegetable shell flour extender and minor amounts in finely divided form of sodium lignate, of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

14. Plywood-, and laminating-adhesive solutions comprising a thermosetting aldehydic resin glue selected from the group consisting of phenolic-aldehyde resins and amino-aldehyde resins in aqueous alkaline colloidal solution, a vegetable shell flour extender, free alkali and minor amounts of an extracted lignin, of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

15. Plywood-, and laminating-adhesive solutions comprising a thermosetting aldehydic resin glue selected from the group consisting of phenolic-aldehyde resins and amino-aldehyde resins in aqueous alkaline colloidal solution, a vegetable shell flour extender and minor amounts of sodium lignate, of an extracted lignin in oxidized condition and containing about 1 to 7 mols of added oxygen per mol of lignin, and of a lignocellulosic furfural by-product residue remaining after the extraction of pentosans by acid hydrolysis from pentosan-containing material from plants of the family Graminales.

References Cited in the file of this patent

UNITED STATES PATENTS

| | | |
|---|---|---|
| 2,161,748 | Samaras et al | June 6, 1939 |
| 2,506,486 | Bender et al | May 2, 1950 |
| 2,507,465 | Ayers | May 9, 1950 |
| 2,669,522 | Othmer et al. | Feb. 16, 1954 |
| 2,727,869 | Ash et al. | Dec. 20, 1955 |
| 2,878,197 | Baxter et al | Mar. 17, 1959 |